United States Patent
Beadle et al.

(10) Patent No.: US 9,043,406 B2
(45) Date of Patent: May 26, 2015

(54) DYNAMICALLY CREATING HISTORICAL GROUPS IN A MESSAGING CLIENT

(75) Inventors: Gary St. Mark Beadle, Round Rock, TX (US); Bethany Lyn Kessen, Austin, TX (US); Christopher Joseph Paul, Durham, NC (US); Brian Lee White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1927 days.

(21) Appl. No.: 12/062,025

(22) Filed: Apr. 3, 2008

(65) Prior Publication Data

US 2008/0189276 A1    Aug. 7, 2008

Related U.S. Application Data

(63) Continuation of application No. 10/965,174, filed on Oct. 14, 2004, now abandoned.

(51) Int. Cl.
| | | |
|---|---|---|
| G06F 15/16 | (2006.01) | |
| G06F 3/00 | (2006.01) | |
| G06F 3/048 | (2013.01) | |
| G06Q 10/10 | (2012.01) | |

(52) U.S. Cl.
CPC .................................. *G06Q 10/107* (2013.01)

(58) Field of Classification Search
CPC ..................................................... G06Q 10/107
USPC ........................... 709/206; 715/745, 789, 811
See application file for complete search history.

(56) References Cited

U.S. PATENT DOCUMENTS

| | | | |
|---|---|---|---|
| 5,666,502 A * | 9/1997 | Capps ........................... 715/811 |
| 6,011,554 A * | 1/2000 | King et al. .................... 715/811 |
| 6,119,114 A * | 9/2000 | Smadja ................................. 1/1 |
| 6,351,764 B1 * | 2/2002 | Voticky et al. ................ 709/207 |
| 6,539,421 B1 | 3/2003 | Appelman et al. |
| 6,590,588 B2 | 7/2003 | Lincke et al. |
| 6,642,941 B1 | 11/2003 | Kurata et al. |
| 6,832,245 B1 * | 12/2004 | Isaacs et al. .................. 709/206 |
| 7,010,758 B2 * | 3/2006 | Bate .............................. 715/841 |
| 7,111,044 B2 | 9/2006 | Lee |
| 7,313,760 B2 | 12/2007 | Grossman et al. |
| 7,512,399 B2 * | 3/2009 | Gates ......................... 455/412.1 |
| 7,512,652 B1 | 3/2009 | Appelman et al. |
| 7,698,652 B2 * | 4/2010 | Sagar ............................ 715/787 |
| 2001/0002469 A1 * | 5/2001 | Bates et al. ........................ 707/1 |
| 2003/0065721 A1 | 4/2003 | Roskind |
| 2003/0105815 A1 | 6/2003 | Gusler et al. |
| 2004/0046787 A1 | 3/2004 | Henry et al. |

(Continued)

OTHER PUBLICATIONS

Final Office Action dated Aug. 26, 2008, regarding U.S. Appl. No. 10/965,174, 16 pages.

(Continued)

*Primary Examiner* — Guang Li
(74) *Attorney, Agent, or Firm* — Yee & Associates, P.C.; William J. Stock

(57) ABSTRACT

A method, apparatus, and computer instructions for managing user lists are provided. A group of instant messaging addresses used most frequently by a user of an instant messaging client on the communications device is identified. The identified group of instant messaging addresses is displayed visibly within a display in the communications device.

21 Claims, 3 Drawing Sheets

(56) References Cited

U.S. PATENT DOCUMENTS

| | | |
|---|---|---|
| 2004/0054646 A1 | 3/2004 | Daniell et al. |
| 2004/0056901 A1* | 3/2004 | March et al. ............. 345/811 |
| 2004/0113952 A1* | 6/2004 | Randall ..................... 345/830 |
| 2005/0198131 A1* | 9/2005 | Appelman et al. ......... 709/204 |
| 2006/0085752 A1 | 4/2006 | Beadle et al. |
| 2008/0055264 A1* | 3/2008 | Anzures et al. ............ 345/173 |

OTHER PUBLICATIONS

Notice of Allowance dated Aug. 13, 2009, regarding U.S. Appl. No. 10/965,174, 8 pages.
Office Action dated Feb. 4, 2009, regarding U.S. Appl. No. 10/965,174, 14 pages.
Office Action dated Apr. 29, 2008, regarding U.S. Appl. No. 10/965,174, 17 pages.

* cited by examiner

DYNAMICALLY CREATING HISTORICAL GROUPS IN A MESSAGING CLIENT

This application is a continuation of application Ser. No. 10/965,174, filed Oct. 14, 2004, now abandoned.

BACKGROUND OF THE INVENTION

1. Technical Field

The present invention relates generally to an improved data processing system and in particular to an improved method and apparatus for processing data. Still more particularly, the present invention relates to a method, apparatus, and computer instructions for managing messaging addresses in an instant messaging client.

2. Description of Related Art

Instant messaging is an online chat medium, allowing users to communicate with each other and collaborate in real-time over a network data processing system. Instant messaging is commonly used over the Internet. Instant messaging applications monitor and report the status of users that have established each other as online contacts. This information is typically presented to a user in a window. Instant messaging applications also are often used by users conducting business. By utilizing instant messaging, business users can view each other's availability and initiate a text conversation with colleagues or customers when a desired contact becomes available.

Typically, with instant messaging applications, communications between users are initiated by users selecting the name of the person with whom they desire to communicate. Then, the users type messages in a dialog box in the window and press "send". These messages appear instantly on the other selected recipient's computer.

Until now, instant messaging has been developed largely for home users, but used by home and business users alike. Instant messaging allows an organization to deploy and utilize this "need-to-have" technology in a business setting.

Additionally, instant messaging has moved into the mobile arena. Personal digital assistants (PDAs) and mobile phones now provide instant messaging capabilities to allow users to instant message each other in the same manner as from a more traditional fixed data processing system. Mobile users, however, are only allowed a very small amount of screen space for their applications. When it comes to using an instant messaging client on a mobile device, such as a mobile phone, oftentimes only six to seven lines of text are displayed. As a result, it is more difficult to read instant messages. Further, it is also more difficult to select different functions from the instant messaging client due to the limited amount of display space.

Therefore, it would be advantageous to have an improved method, apparatus, and computer instructions for managing data for an instant messaging client to reduce the amount of scrolling necessary to view the data and to initiate different functions.

SUMMARY OF THE INVENTION

The present invention provides a method, apparatus, and computer instructions for managing user lists. A group of instant messaging addresses used most frequently by a user of an instant messaging client on the communications device is identified. The identified group of instant messaging addresses is displayed visibly within a display in the communications device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
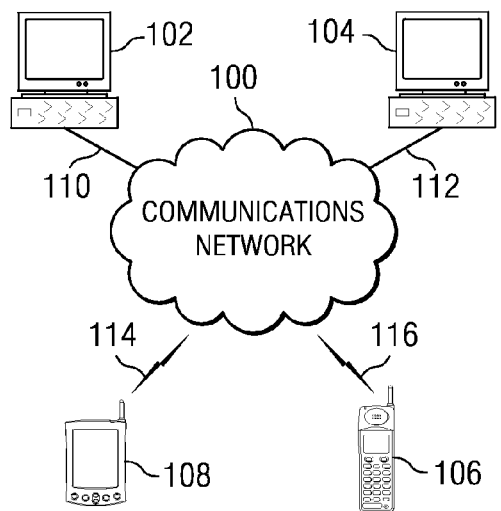
FIG. 1 is a diagram of a communications system in which the present invention may be implemented in accordance with a preferred embodiment of the present invention.

With reference now to the Figures and in particular with reference to FIG. 1, a diagram of a communications system in which the present invention may be implemented is depicted in accordance with a preferred embodiment of the present invention. Communications network 100 contains different types of networks. For example, communications network 100 may include a local area network (LAN), a wide area network (WAN), a public switched telephone network (PSTN), and a wireless communications network. Of course, communications network 100 may include other types of networks in addition to or in place of the ones in this example. Communications network 100 includes connections such as wire, wireless communications links, or fiber optic cables. In this example, computer 102 and computer 104 are connected to communications network 100 and may include instant messaging clients from which users may transmit and receive messages during a chat session with other users. Additionally, mobile phone 106 and personal digital assistant 108 also are connected to communications network 100. These two devices also contain instant messaging clients for use by users to exchange messages.

Computer 102 is connected to communications network 100 through physical link 110, and computer 104 is connected to communications network 100 through physical link 112. In contrast, mobile phone 106 is connected to communications network 100 through wireless communications link 116, and personal digital assistant 108 is connected to communications network 100 through wireless communications link 114.

The mobile devices, mobile phone 106 and personal digital assistant 108, provide smaller display space for users. As mentioned before, with a smaller number of lines being displayed, less data can be displayed and access to functions is made more difficult.

The present invention recognizes that selecting instant messaging addresses for users is made more difficult because only a few lines, such as six or seven lines, may be viewed at one time before requiring the user to scroll the screen. As a result, when a user has a large number of instant messaging addresses, the user may be required to scroll through the list to find a particular address that the user wishes to select for a chat session. The present invention provides an improved method, apparatus, and computer instructions for managing instant messaging addresses in an instant messaging client to reduce or eliminate the scrolling needed to select users for chat sessions.

Figure 2:
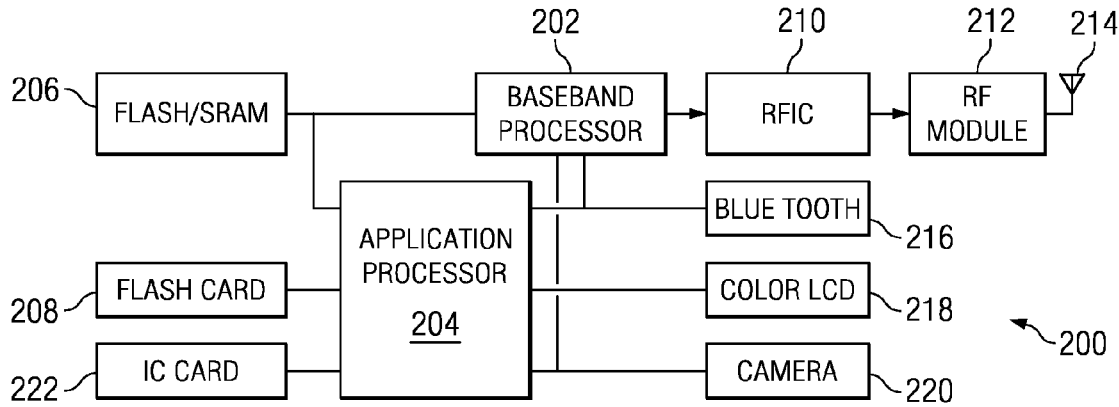
FIG. 2 is a block diagram of a camera phone in accordance with a preferred embodiment of the present invention.

Turning next to FIG. 2, a block diagram of a camera phone is depicted in accordance with a preferred embodiment of the present invention. Camera phone 200 includes baseband processor 202, application processor 204, flash/static random access memory (SRAM) 206, flash card 208, radio frequency integrated circuit (RFIC) 210, radio frequency (RF) module 212, antenna 214, Blue Tooth unit 216, color liquid crystal display (LCD) 218, camera 220, and IC card 222.

Baseband processor 202 provides for receiver and transmitter operations and is also referred to as a transceiver. In particular, baseband processor 202 handles all of the audio, signal, and data processing needed to receive and send data using RF transmissions or Blue Tooth transmissions. Application processor 204 provides the processing power for other functions within camera phone 200. For example, calculators, calendars, alarms, camera functions, and directories are provided through application processor 204. Flash/SRAM 206 is a storage device in which various instructions for providing the functions within camera phone 200 are located and provide upgrades. Flash card 208 is a storage device in which user data and applications may be stored. An example of flash card 208 is a secure digital card.

A pathway for the transmission of voice and other types of data is through RFIC 210. Additionally, short range transmissions may be sent or received through Blue Tooth unit 216. Blue Tooth unit 216 conforms to Blue Tooth wireless specification, which defines the link layer and application layer for product developers. Both of these transmissions are made through antenna 214 in this illustrative example.

Color LCD 218 provides a display for pictures and other data for camera phone 200. Camera 220, in this example, is a complementary metal oxide semiconductor (CMOS) camera which may be built into camera phone 200 or connected to camera phone 200 as a module, such as IC card 222. IC card 222 also may contain other application specific functions, such as a global positioning system (GPS) or other functions, such as a modem or additional memory.

Camera 220 forms the camera module of camera phone 200, while the other components form the digital phone module of camera phone 200 in these illustrative examples. Instructions or circuits are added to camera phone 200 to display users with whom a user chats most frequently.

Figure 3:
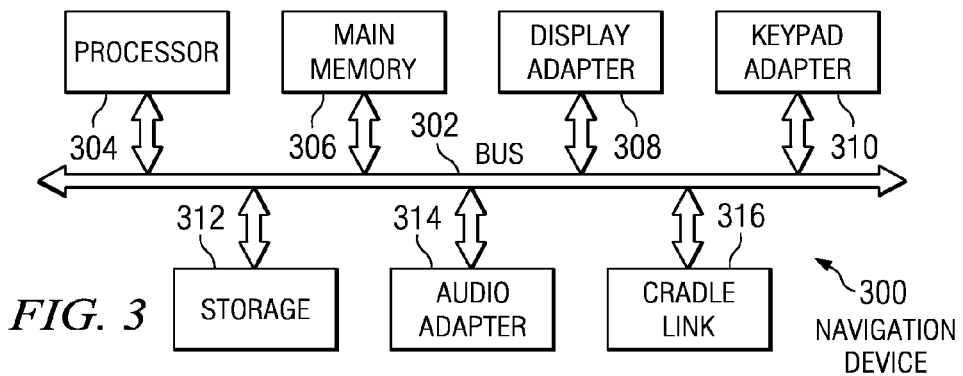
FIG. 3 is a block diagram of a PDA in accordance with a preferred embodiment of the present invention.

Turning now to FIG. 3, a block diagram of a PDA is shown in accordance with a preferred embodiment of the present invention. PDA 300 is an example of a PDA, such as PDA 108 in FIG. 1, in which code or instructions implementing the processes of the present invention may be located. PDA 300 includes a bus 302 to which processor 304 and main memory 306 are connected. Display adapter 308, keypad adapter 310, storage 312, and audio adapter 314 also are connected to bus 302. Cradle link 316 provides a mechanism to connect PDA 300 to a cradle used in synchronizing data in PDA 300 with another data processing system. Further, display adapter 308 also includes a mechanism to receive user input from a stylus when a touch screen display is employed.

An operating system runs on processor 304 and is used to coordinate and provide control of various components within PDA 300 in FIG. 3. The operating system may be, for example, a commercially available operating system such as Windows CE, which is available from Microsoft Corporation. Instructions for the operating system and applications or programs are located on storage devices, such as storage 312, and may be loaded into main memory 306 for execution by processor 304.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3.

Figure 4:
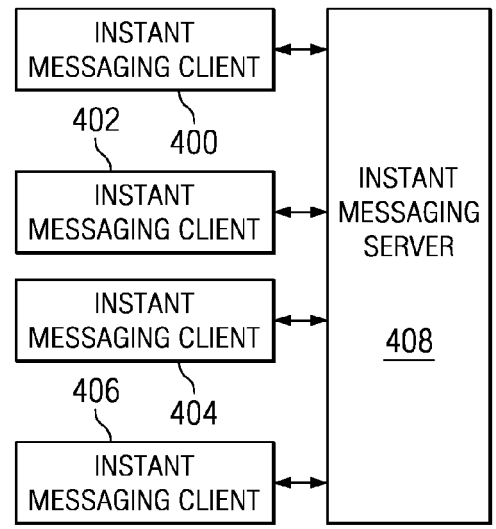
FIG. 4 is a diagram illustrating an instant messaging system in which the present invention may be implemented in accordance with a preferred embodiment of the present invention.

Turning now to FIG. 4, a diagram illustrating an instant messaging system in which the present invention may be implemented is depicted in an illustrative embodiment. In this example, instant messaging clients 400, 402, 404, and 406 log on to instant messaging server 408. Each of these instant messaging clients may be located on a device such as, for example, camera phone 200 in FIG. 2 or PDA 300 in FIG. 3. These instant messaging clients may take various forms. For example, the instant messaging client may be Sametime Connect, which is available from International Business Machines Corporation. Another example of an instant messaging system is AOL instant messenger from America On-Line, Inc.

The present invention provides a method, apparatus, and computer instructions for managing instant messaging addresses for users presented through the instant messaging client for a user to select for a chat session. These user lists are also referred to as a people list or a buddy list. These types of lists are typically organized by user-determined groups. These groups reflect groups saved on a server, such as instant messaging server 408. The mechanism of the present invention also may be implemented in instant messaging server 408 instead of on one of the instant messaging clients depending on the particular implementation.

The mechanism of the present invention generates a group in which the entries contain addresses or users that a user has most frequently communicated with. This particular grouping is displayed in a manner such that the group is displayed at the top of the list or in a position such that scrolling to see these entries is minimized or eliminated. The list generated by the mechanism of the present invention has a limited number of entries to reduce the necessity for scrolling. For example, the group may contain five entries for instant messaging addresses with which the user of an instant messaging client has had the most frequent communication.

Figure 5:
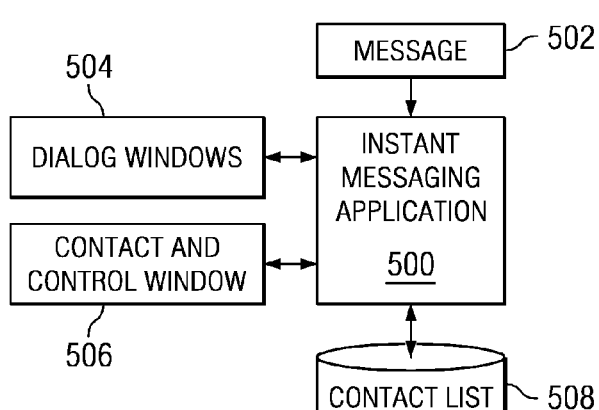
FIG. 5 is a diagram illustrating components used in an instant messaging system in accordance with a preferred embodiment of the present invention.

Turning next to FIG. 5, a diagram illustrating components used in an instant messaging system is depicted in accordance with a preferred embodiment of the present invention. In the depicted example, instant messaging application 500 processes messages, such as message 502, received from users located on remote data processing systems. As messages are received, these messages are presented in dialog windows 504. Messages exchanged between instant messaging application 500 and an instant messaging application on a remote data processing system form a conversation in these examples.

Additionally, dialog windows 504 provide an interface for user input to send messages to other users. Contact and control window 506 is presented by instant messaging application 500 to provide the user with a list of user names, as well as other information, such as, for example, identifying other users that are currently online. Contact and control window 506 also provides an interface to allow the user to set different preferences. For example, the user may set passwords required to access different names used in instant messaging sessions. Further, a user may employ contact and control window 506 to set other preferences, such as colors and fonts used in instant messaging application 500.

Further, the list of names presented by contact and control window 506 is stored in contact list 508 in these examples. Additional user names may be added or deleted from contact list 508. This contact list is employed in presenting the list of names within contact and control window 506. Additionally, the user may view the status of other users on contact and control window 506. This status may be, for example, available or busy. When the status is available, instant messaging application 500 will accept messages from another instant messaging application to start a new conversation. When the status of another user is busy, messages from instant messaging application 500 are not accepted by the other application for that user.

The mechanism of the present invention for identifying users or instant messaging addresses used most frequently by a user may be implemented as a process within instant messaging application 500. In particular, instant messaging application 500 may include a process to identify the frequency with which a user uses instant messaging addresses for chat sessions. These messaging addresses may include information about users on a user list, such as names, email addresses, user IDs, and nicknames. With the frequency, a subset of the users in a user list may be identified and displayed visibly within a display of a communications device in a manner such that scrolling is avoided. By identifying the most frequently used entries and displaying those entries in a group within a display, a user is less likely to scroll down the user list to look for other users. As a result, the user list in an instant messaging client is made more usable and convenient to the user.

Although the depicted examples illustrate the processes being implemented in an instant messaging client, these processes may be implemented in other components. For example, the identification of the frequency of use of instant messaging entries could be implemented on an instant messaging server if messages and chat sessions are always relayed through the instant messaging server.

Figure 6:
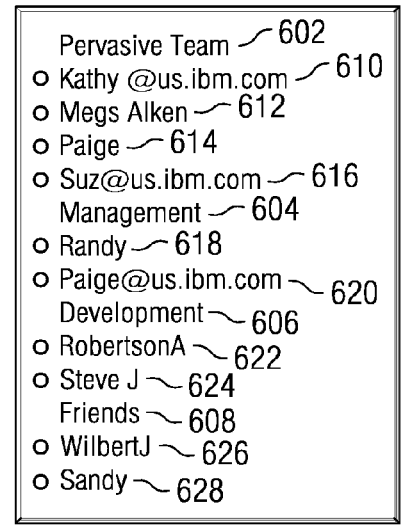
FIG. 6 is a diagram illustrating a user list in accordance with a preferred embodiment of the present invention.

Turning now to FIG. 6, a diagram illustrating a user list is depicted in accordance with a preferred embodiment of the present invention. User list 600 contains instant messaging addresses for users that are grouped into different groups. In this example, the groups include Pervasive Team 602, Management 604, Development 606, and Friends 608. Pervasive Team 602 contains entries 610, 612, 614, and 616. Management 604 contains entries 618 and 620, while Development 606 contains entries 622 and 624. Friends 608 contains entries 626 and 628.

If the user for user list 600 chats with people dispersed across these different groups, a usability issue occurs with respect to devices such as a mobile phone or PDA. If only six or seven lines are displayed, then all of the entries cannot be viewed at a single time. If a user chats with several people across these different groups, the user must continually scroll through the user list. In this example, a history group or other selected group containing entries for users with which the most frequent communication has occurred is not shown in the instance in which the process for generating such a group has not yet been run.

Figure 7:
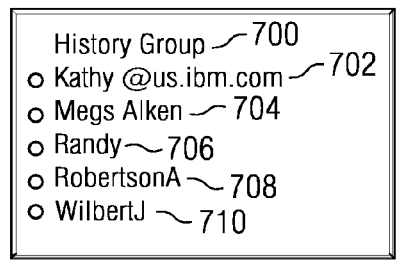
FIG. 7 is an illustration of a history group in accordance with a preferred embodiment of the present invention.

Turning next to FIG. 7, an illustration of a history group is depicted in accordance with a preferred embodiment of the present invention. In this example, History Group 700 is an example of a group of users that is generated by identifying entries for users with which the user chats most often. In these examples, the frequency may be determined on a daily basis. As a result, History Group 700 may change on a day-to-day basis.

In this example, History Group 700 contains entries 702, 704, 706, 708, and 710. Entry 702 comes from Pervasive Team 602 in FIG. 6, entry 704 comes from Management 604 in FIG. 6, entry 706 comes from Management 604 in FIG. 6, entry 708 comes from Development 606 in FIG. 6, and entry 710 comes from Friends 608 in FIG. 6.

Although in this example the group is described as being identified from those with which the most frequent chats have occurred on a daily basis, this identification of frequency may be made in many ways. For example, the identification may be made on an hourly basis, weekly basis or even continuously. The mechanism of the present invention is dynamic and will adjust the group automatically.

Figure 8:
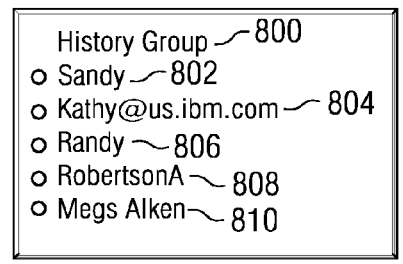
FIG. 8 is a diagram of a history group in accordance with a preferred embodiment of the present invention.

With reference next to FIG. 8, a diagram of a history group is depicted in accordance with a preferred embodiment of the present invention. In this example, History Group 800 contains a different grouping from History Group 700 in FIG. 7 due to changes in frequency of chats with different users from a user list, such as user list 600 in FIG. 6. In this example, History Group 800 contains entries 802, 804, 806, 808, and 810. Entry 802 comes from Friends 608 in FIG. 6, entry 804 comes from Pervasive Team 602 in FIG. 6, entry 806 comes from Management 604 in FIG. 6, entry 808 comes from Development 606 in FIG. 6, and entry 810 comes from Friends 608 in FIG. 6. The group changes based on the changes in frequency of communications between the user and other users for the entries in the user list.

Figure 9:
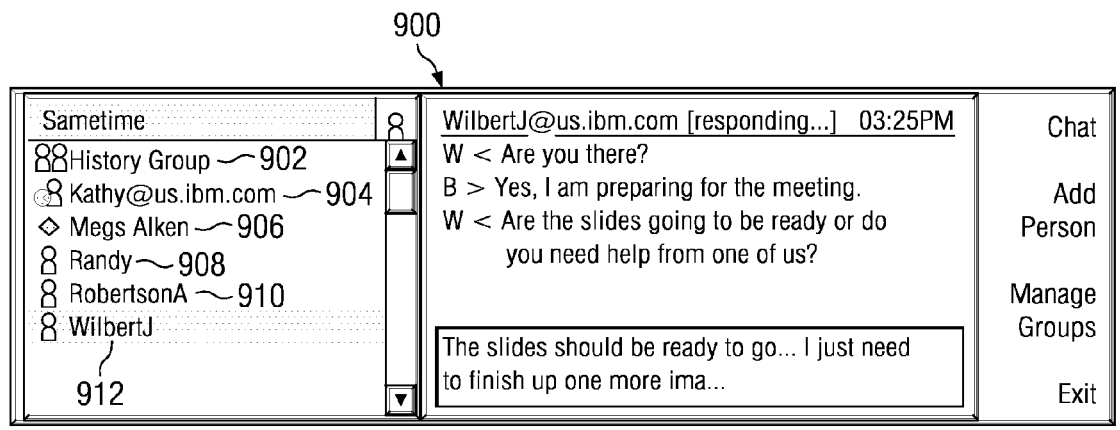
FIG. 9 is a display of a history group in accordance with a preferred embodiment of the present invention.

With reference now to FIG. 9, a display of a history group is depicted in accordance with a preferred embodiment of the present invention. In this example, display 900 is an example of a display that may be presented on a device with limited display area, such as a PDA or a mobile phone. In this example, History Group 902 contains entries 904, 906, 908, 910, and 912. These entries represent users with which the user communicates most frequently on a daily basis in these illustrative examples.

Other numbers of entries may be displayed other than the five entries shown in display 900. The number of entries displayed depends on the size of the display in a device and on how much the user desires to scroll through entries. Even though some limited scrolling may occur, the mechanism of the present invention places History Group 902 in a top level. As a result, this is the group within the user list shown first and any scrolling, if needed, if minimized.

This mechanism of the present invention allows a user an effective system for managing user lists because the amount of scrolling is limited based on the manner in which entries are selected for History Group 902. Additionally, the mechanism of the present invention dynamically organizes History Group 902 to contain entries for users with which the user communicates most frequently into a single group. As a result, the entries used most often are readily available in a single group that is expanded at the top of the user list each time the user logs on to the instant messaging client.

Figure 10:
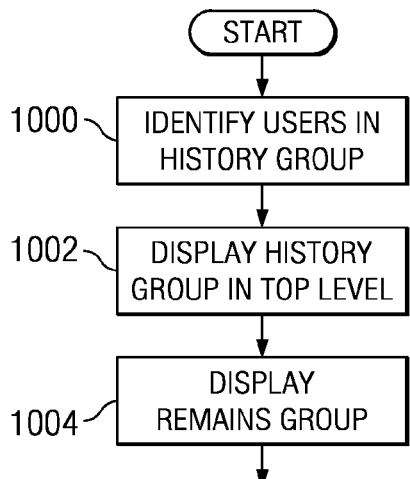
FIG. 10 is a flowchart of a process for displaying a user list in accordance with a preferred embodiment of the present invention.

Turning next to FIG. 10, a flowchart of a process for displaying a user list is depicted in accordance with a preferred embodiment of the present invention. The process illustrated in FIG. 10 may be implemented in an instant messaging client, such as the instant messaging client described in FIG. 5 above.

The process begins by identifying users in a history group from a user list (step 1000). This identification may be made by identifying the number of users or entries that are to be present in this group. Thereafter, the group is populated using entries having the most frequent communication with the user. Next, the history group is displayed in the top level (step 1002). This display is in a manner as illustrated in display 900 in FIG. 9. Thereafter, the remaining groups are displayed (step 1004) with the process terminating thereafter. The display of the remaining groups is below the history group. In this manner, the history group is most accessible to the user and allows for easy access to entries within that group, while minimizing the scrolling that occurs.

Figure 11:
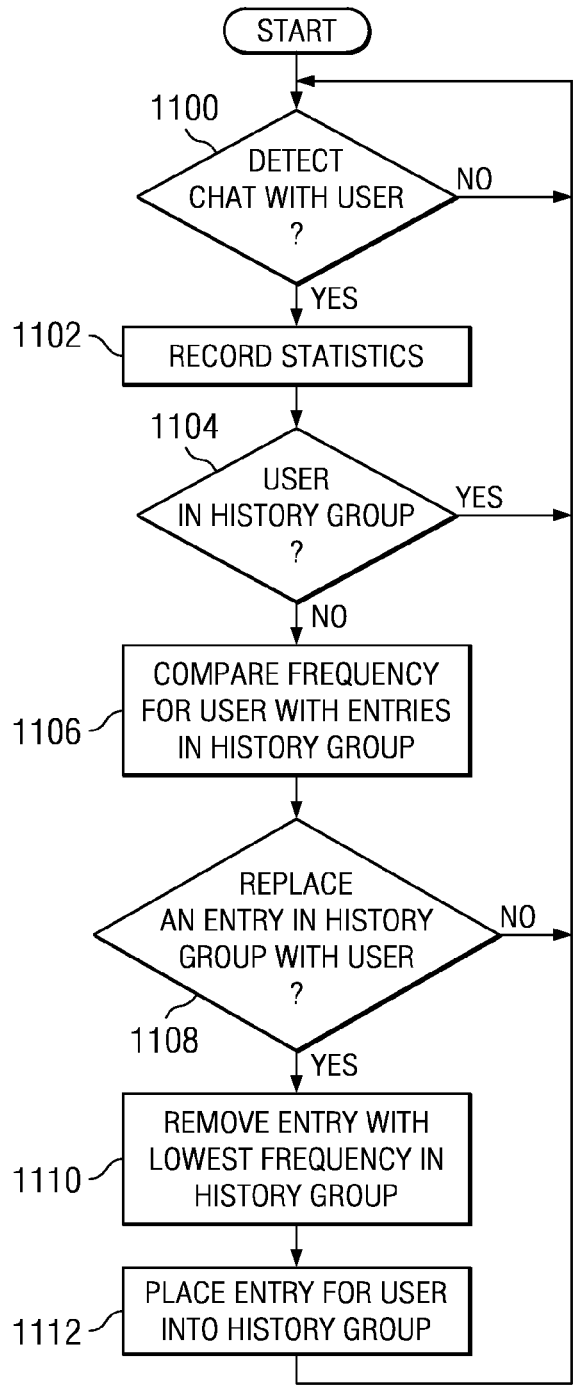
FIG. 11 is a flowchart of a process for dynamically updating a history group in accordance with a preferred embodiment of the present invention.

With reference next to FIG. 11, a flowchart of a process for dynamically updating a history group is depicted in accordance with a preferred embodiment of the present invention. The process illustrated in FIG. 11 may be implemented in an instant messaging client, such as the instant messaging client described in FIG. 5.

The process begins by determining whether a chat with a user from a user list is detected (step 1100). If a chat is not detected, the process returns to step 1100. When a chat with a user in the user list is detected, then statistics are recorded (step 1102).

These statistics may take various forms depending on the manner in which the frequency is to be calculated. For example, these statistics may be the number of messages sent to the user on a list, the number of messages received from the user on the list, or a combination of the two. Additionally, these statistics also may include the number of words or characters sent and received with the user on the list.

Next, a determination is made as to whether the user is currently in the history group (step 1104). If the user is currently in the history group, the process returns to step 1100.

If the user is not in the history group, then the frequency for the user identified for the chat session is compared with entries for users in the history group (step 1106). Then a determination is made as to whether a replacement of an entry in the history group should be made with the user (step 1108). If a replacement is not to be made, the process returns to step 1100.

Otherwise, an entry with the lowest frequency in the history group is removed (step 1110). Thereafter, an entry for the user is placed into the history group (step 1112).

FIG. 11 illustrates a dynamic update of a history group in which the update occurs as statistics are gathered. Depending on the particular implementation, steps 1104 through 1112 may be initiated on a periodic basis, such as daily, weekly, or hourly. The frequency at which changes are made to the history group depends on the particular implementation and may be a user-specified preference Of course, various algorithms and mechanisms may be used for populating the history groups described above. One example of another algorithms may be basing the frequency on the total number of messages sent and received with respect to a user on the user list, the total number of messages sent to the user on the address list, and or the total number of messages received from the user on the user list. Another example bases the frequency on the number of chats initiated by the user of the instant messaging program or the number of chats initiated by a user on the user list. The frequency may be based on the total number of characters or data exchanged. Further, caching algorithms for Web pages on Web servers and gateways may be modified to identify frequency of users on a user list instead of Web pages. A similar modification may be made with respect to algorithms for cache lines in a cache.

Thus, the present invention provides an improved method, apparatus, and computer instructions for managing user lists in a communications device. The mechanism of the present invention identifies a group of instant messaging addresses used most frequently by a user of an instant messaging client on the communications device. This group is displayed visibly on the display of the communications device in a manner to reduce or eliminate the scrolling needed to select entries from the user lists.

Although the depicted examples are illustrated with respect to devices having a limited display area, the mechanism of the present invention may be applied to other communications devices, such as computers, that have sufficient display area to display entire user lists.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in an instant messaging server device for managing user lists, the method comprising:

identifying, by the instant messaging server device, a group of instant messaging addresses used most frequently by a user of an instant messaging client on the client device from a plurality of instant messaging addresses within a plurality of user-determined groups in a user list stored on the instant messaging server device;

generating, by the instant messaging server device, a history group that is a subset of the plurality of instant messaging addresses within the plurality of user-determined groups in the user list stored on the instant messaging server device and includes only a predetermined number of instant messaging addresses based on a size of the display device in the client device so that the history group is entirely displayed within the display device at a same time; and displaying, by the instant messaging server device, the history group of instant messaging addresses at a top level above the plurality of user-determined groups in the user list visibly within a display device in the client device to eliminate user scrolling to find an instant messaging address within the history group of instant messaging addresses.

2. The method of claim 1, wherein the client device is selected from one of a desktop computer, a mobile phone, and a personal digital assistant.

3. The method of claim 1 further comprising:
tracking, by the instant messaging server device, a number of instant messages sent between the user of the instant messaging client on the client device and a plurality of instant messaging addresses within the plurality of user-determined groups in the user list stored on the instant messaging server device.

4. The method of claim 3, wherein the identifying step includes:
selecting, by the instant messaging server device, the history group of instant messaging addresses based on instant messaging addresses having a highest number of messages.

5. The method of claim 1, wherein the history group of instant messaging addresses dynamically changes as a frequency of use changes.

6. The method of claim 1, wherein the identifying step occurs each time the instant messaging client is started.

7. The method of claim 1, wherein the history group of instant messaging addresses used most frequently by the user of the instant messaging client is determined using a selected algorithm.

8. A data processing system for managing user lists, the data processing system comprising:
a bus system;
a communications unit connected to the bus system;
a memory connected to the bus system, wherein the memory stores a set of instructions; and
a processing unit connected to the bus system, wherein the processing unit executes the set of instructions to identify a group of instant messaging addresses used most frequently by a user of an instant messaging client on the client device from a plurality of instant messaging addresses within a plurality of user-determined groups in a user list stored on the instant messaging server device; generate a history group that is a subset of the plurality of instant messaging addresses within the plurality of user-determined groups in the user list stored on the instant messaging server device and includes only a predetermined number of instant messaging addresses based on a size of the display device in the client device so that the history group is entirely displayed within the display device at a same time; and display the group of instant messaging addresses at a top level above the plurality of user-determined groups in the user list visibly within a display device in the client device to eliminate user scrolling to find an instant messaging address within the group of instant messaging addresses.

9. The data processing system of claim 8, wherein the client device is selected from one of a desktop computer, a mobile phone, and a personal digital assistant.

10. The data processing system of claim 8, wherein the processing unit executes a further set of instructions to track a number of instant messages sent between the user of the instant messaging client on the client device and the plurality of instant messaging addresses within the plurality of user-determined groups in the user list stored on the instant messaging server device.

11. The data processing system of claim 10, wherein the set of instructions to identify the group of instant messaging addresses used most frequently by the user of the instant messaging client includes selecting the history group of instant messaging addresses based on instant messaging addresses having a highest number of messages.

12. The data processing system of claim 8, wherein the history group of instant messaging addresses dynamically changes as a frequency of use changes.

13. The data processing system of claim 8, wherein the set of instructions to identify the group of instant messaging addresses used most frequently by the user of the instant messaging client is executed each time the instant messaging client is started.

14. The data processing system of claim 8, wherein the history group of instant messaging addresses used most frequently by the user of the instant messaging client is determined using a selected algorithm.

15. A computer program product stored on a non-transitory computer readable storage medium having instructions embodied thereon for managing user lists, the computer program product comprising:
first instructions for identifying a group of instant messaging addresses used most frequently by a user of an instant messaging client on the client device from a plurality of instant messaging addresses within a plurality of user-determined groups in a user list stored on the instant messaging server device;
second instructions for generating a history group that is a subset of the plurality of instant messaging addresses within the plurality of user-determined groups in the user list stored on the instant messaging server device and includes only a predetermined number of instant messaging addresses based on a size of the display device in the client device so that the history group is entirely displayed within the display device at a same time; and
third instructions for displaying the group of instant messaging addresses at a top level above the plurality of user-determined groups in the user list visibly within a display device in the client device to eliminate user scrolling to find an instant messaging address within the group of instant messaging addresses.

16. The computer program product of claim 15, wherein the client device is selected from one of a desktop computer, a mobile phone, and a personal digital assistant.

17. The computer program product of claim 15 further comprising:
fourth instructions for tracking a number of instant messages sent between the user of the instant messaging client on the client device and a plurality of instant messaging addresses within the plurality of user-determined groups in the user list stored on the instant messaging server device.

18. The computer program product of claim 17, wherein the first instructions include:
sub instructions for selecting the history group of instant messaging addresses based on instant messaging addresses having a highest number of messages.

19. The computer program product of claim 15, wherein the history group of instant messaging addresses dynamically changes as a frequency of use changes.

20. The computer program product of claim 15, wherein the first instructions are executed each time the instant messaging client is started.

21. The computer program product of claim 15, wherein the history group of instant messaging addresses used most frequently by the user of the instant messaging client is determined using a selected algorithm.

* * * * *